3,708,462
CROSS-LINKED STYRYLPHOSPHINE RESINS
Suzanne V. McKinley, Wellesley, and Joseph W. Rakshys, Jr., Framingham, Mass., assignors to The Dow Chemical Company, Midland, Mich.
No Drawing. Filed Apr. 8, 1971, Ser. No. 132,605
Int. Cl. C08f 15/40
U.S. Cl. 260—80.71          14 Claims

ABSTRACT OF THE DISCLOSURE

Novel resins having a carbon-to-carbon backbone, cross-linked with carbon-to-carbon linkages and a plurality of pendant groups of the structure

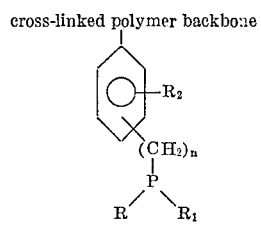

wherein $n$ is an integer from 0 to 3, R and $R_1$ are hydrocarbon groups of from 1 to 12 C atoms each, $R_2$ is H or up to 4 alkyl groups of 1 to 4 C atoms each, are prepared by copolymerizing a dihydrocarbyl vinyl aromatic phosphine with a polyolefinically unsaturated monomer or by copolymerizing said monomers with one or more monoolefinically unsaturated monomer which is copolymerizable with dihydrocarbyl vinyl aromatic phosphine and/or a vinyl aromatic compound. The novel cross-linked polymers can also be prepared by converting a cross-linked vinyl brominated or iodinated aromatic hydrocarbon polymer to a lithium derivative and then reacting the latter with a dihydrocarbyl halo phosphine, or reacting the lithium derivative with trimethylene oxide, then halogen, followed by lithium dihydrocarbyl phosphine.

The novel polymers have a utility for catalyzing reactions in which monomeric trihydrocarbyl phosphines act as catalysts, namely, the dimerization of alpha-beta unsaturated nitriles, carboxylic acid esters or ketones and the oligomerization or polymerization thereof under certain circumstances.

BACKGROUND OF THE INVENTION

Monomeric trihydrocarbyl phosphines are known to catalyze a number of reactions, including the dimerization of alpha-beta olefinically unsaturated aliphatic esters, nitriles and acyl derivatives. A problem with the monomeric catalysts is that because they are soluble, they cannot be used in a continuous process, whereas the polymeric catalysts provide this advantage. Another problem with the monomeric trihydrocarbyl phosphine catalysts is that in many cases the catalyst must be degraded and removed from the reaction system by the known relatively complicated and expensive means of separating a dissolved substance before isolation of the desired product. The polymeric catalyst, however, is removed by simple filtration. A further problem with monomeric catalysts is that the reaction is not usually limited to dimerization, because in most cases low molecular weight liquid to low melting, to solid, polymers also are formed. Linear homopolymers of p-vinyl triphenyl phosphine and copolymers thereof with styrenes are disclosed in an article entitled "Über Polystyrolderivate Mit Elementen der Fünften Hauptgruppe" by Braun et al. in Die Makromolekulare Chemie, vol. 62, pages 183–195, 1963. The phosphine homopolymer and the styrene copolymer are very soluble in benzene or toluene but can be precipitated therefrom with methanol. The conversions are fairly low, 12.5–16.8%, at 65° C. with azobisisobutyronitrile as a polymerization catalyst. No utility for the linear polymers having pendant triphenyl phosphine groups are disclosed by the authors.

SUMMARY OF THE INVENTION

This invention relates to addition of polymers cross-linked through carbon-to-carbon bonds, having a plurality of

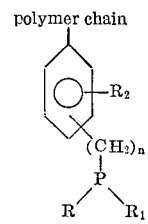

pendant groups on the polymer backbone. In the above formula the pendant groups are also attached to the main polymer chain backbone by carbon-to-carbon bonds. The phosphorus atom or the $(CH_2)_n$ chain can be attached to the arylene groups in the ortho, meta or para position. R and $R_1$ can be any alkyl, cycloalkyl, alkyl substituted cycloaliphatic, aromatic or alkyl substituent aromatic hydrocarbon group. The alkyl hydrocarbon group can have from 1 to 10 C atoms, the cycloaliphatic hydrocarbon group can contain from 3 to 10 C atoms, preferably 5 to 8 and the aromatic hydrocarbon group can contain from 6 to 14 C atoms. The cycloaliphatic and/or aromatic groups can contain from 1 to 5 alkyl substituents of from 1 to 4 C atoms each.

$n$ is an integer or whole number, from 0 to 3 (e.g., methylene, ethylene, propylene).

The R and $R_1$ groups can be the same or different.

The $R_2$ on the aromatic ring represents H and up to 4 alkyl groups of 1 to 4 C atoms each.

The cross-linked phosphine containing polymers of this invention are insoluble in any known organic solvent, but they can be swollen in liquid aromatic hydrocarbons, tetrahydrofuran, dialkyl sulfoxides having from 1 to 4 C atoms in the alkyl group, tetramethylene sulfoxide, diethyl ether, dimethoxyethane or other dialkoxy alkanes and mixtures thereof, and mixtures with liquid aromatic hydrocarbons.

There are at least two general methods for making the cross-linked vinyl aromatic dihydrocarbylphosphine polymers of this invention if the P atom is attached to the aromatic ring.

In the first process a vinyl aromatic dihydrocarbylphosphine is prepared as a monomer. This is then copolymerized with a cross-linking polyolefinic comonomer. If desired, one or more additional monovinyl aromatic compounds can be included in the polymerization. By starting with polymerizable monomers it is possible to control the proportion of phosphine groups in the final cross-linked polymeric substance. Included among such additional monoolefins are styrene, alpha-methyl styrene, vinyl toluene, t-butyl styrene, the vinyl xylenes, isopropenyl toluenes, isopropenyl xylenes, ethyl styrenes and ethyl isopropenyl benzenes. Also, if desired the polymerization can be carried out in the presence of an inert diluent.

The cross-linking ingredient is preferably a polyvinyl aromatic hydrocarbon, e.g., it must contain at least two polymerizable vinyl groups. Included among these are divinyl benzene, trivinyl benzene or diisopropenyl benzene.

The proportion of cross-linking ingredient can range from about 0.1 to about 25% by weight of the monomers, the preferred range being in the vicinity of 2%–8%. The amount of vinyl aromatic dihydrocarbyl phosphine can range from about 10 to about 99.9% by weight of the polymerizable mixture. Preferably the vinyl aromatic dihydrocarbyl phosphine ranges from about 20 to about 50 weight percent and the monoolefinic comonomer is between about 80 and 50 weight percent based on their combined weight.

The polymerization of the monomeric mixtures can be affected in bulk, in solution, in an inert solution, such as a hydrocarbon solvent, e.g., toluene, in emulsion or in suspension. The suspension procedure is preferred because it can be controlled to produce small, fairly uniform beads, which physical form is most desirable for catalytic purposes. The suspension polymerization can be carried out in the presence of an inert diluent, examples of which are liquid hydrocarbons, liquid long chain alcohols or carboxylic acids (such as octanoic acid).

The temperature of polymerization can range from about 40 to about 200° C., but a range of about 60 to about 100° C. would be employed most frequently. The preferred temperature range depends in each case on the catalyst employed.

The polymerization of the mixture can be affected by free radical catalysts, by ionizing or ultraviolet radiation or by heat. Included among the free radical catalysts are the various diazo compounds of which azobisisobutyronitrile is a representative and the organic peroxides of which benzoyl peroxide, lauroyl peroxide, and t-butyl perbenzoate are typically representative. The preferred catalyst is azobisisobutyronitrile.

The amount of catalyst can vary from about 0.1 to about 5% of the weight of the mixture.

An alternative procedure for preparing the phosphine-containing polymers having the P atom attached to the aromatic ring is to react a lithiated, cross-linked vinyl aromatic polymer with a dihydrocarbylphosphine halide. The hydrocarbyl groups can be the same as those described for R and $R_1$ above. The lithiated cross-linked vinyl aromatic polymer can be prepared by known means such as copolymerizing one of the cross-linking ingredients, defined above, with a vinyl bromo or iodo aromatic monomer, with or without the addition of one or more other vinyl aromatic monomers with or without an inert diluent. The bromine or iodine atom can be replaced with lithium, using butyl lithium in an inert solvent as a metal transfer agent. The reaction between the lithiated polymer and dihydrocarbyl phosphine halide should also be carried out in an inert liquid medium, e.g., one that will not react with the lithiated polymer or the halodihydrocarbyl phosphine.

The examples which follow are intended to illustrate but not to limit the invention. All parts are by weight unless otherwise indicated.

Example I

A mixture of 4.9 weight parts of p-styryl diphenyl phosphine, 5.2 weight parts of styrene, and .16 ml. of divinylbenzene (95% purity) and .09 weight part of azobisisobutyronitrile was agitated until solution resulted. The solution was suspended in 64 ml. of an aqueous phase containing 0.19 weight percent methyl cellulose, 0.15 weight percent sodium dichromate and 0.5 weight percent sodium sulfate. The suspension was heated and stirred for about three hours at about 70° C. The cross-linked copolymeric beads which formed were washed with benzene and dried. Elemental analysis verified that the theoretical amount of phosphorus was present in the polymeric molecule. The copolymeric beads are swollen, but not dissolved, by tetrahydrofuran, dimethyl sulfoxide or mixtures thereof.

The cross-linked polymer of this example is particularly useful for dimerizing vinyl methyl ketone, without formation of polymers.

Example II

A cross-linked copolymer made by polymerizing a 3:1 molar ratio of styrene and p-bromostyrene with 1.6 weight percent of divinyl benzene at about 80° C., in an aqueous medium containing 0.19 weight percent methyl cellulose and 0.5 weight percent sodium dichromate, in the presence of benzoyl peroxide catalyst, was separated as small beads. The beads were washed with benzene and then swollen in a mixture of 7 ml. tetrahydrofuran and 7 ml. benzene. The cross-linked polymer was converted to its lithiated derivative with n-butyllithium. The lithium-containing cross-linked polymer was reacted with an excess of chlorodiphenyl phosphine for about 1¼ hours. Excess chlorodiphenyl phosphine was removed by several washings with tetrahydrofuran in the absence of air. Analysis showed that about 50% of the Br atoms reacted to form —$P(C_6H_5)_2$ groups.

Example III

The same copolymeric styrene-p-bromo-styrene beads were converted to the lithiated derivative with n-butyllithium as in Example II. The lithium-containing cross-linked polymer was reacted with an excess of chlorodicyclohexylphosphine for 3–16 hours. Excess chlorodicyclohexylphosphine was removed by several washings with tetrahydrofuran in the absence of air (nitrogen atmosphere). Elemental analysis showed that about 50% of the bromine atoms had been replaced by —$P(C_6H_{11})_2$ groups.

The cross-linked polymers are useful for dimerizing a variety of alpha-beta monounsaturated aliphatic nitriles (e.g., acrylonitrile), acrylate esters. Quite surprisingly in some cases dimerization is effected with little or no greater degree of polymerization. The cross-linked polymers containing p - styryldicyclohexylphosphine pendant groups (Example III) were added, in a .24 mmole quantity, to 9.45 mmoles $CH_2CHCN$, 0.43 mmole ethanol and 3–5 ml. benzene. After 160 hours at room temperature the catalyst beads were separated from the liquid and unreacted acrylonitrile was removed by distillation A 66% yield of 2,4-dicyanobuten-1 was obtained. Recovery of unreacted acrylonitrile indicated an essentially quantitative conversion, indicating a lack of formation of any polymer. When methylacrylate was substituted for acrylonitrile some lonitrile was removed by distillation. A 66% yield of 2,4-no solid polymer formed.

With vinyl methyl ketone, high oligomers and polymers are the primary products.

In all the above examples the P atom is attached directly to the aromatic ring of the polymer.

The general procedure for making the polymers with

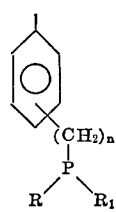

pendant groups is to react a swollen, cross-linked polymer having

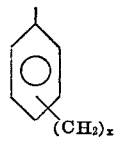

groups, where X is a halogen with atomic number at least 17, and a lithiated dihydrocarbyl phosphine ($RR_1P^-Li^+$), Cross-linked polymers containing

groups can be made by copolymerizing the cross-linking agent and the corresponding substituted styrene (e.g., chloro-, bromo-, or iodomethyl; chloro-, bromo-, or iodoethyl; or chloro-, bromo-, n-iodopropyl styrene). Other comonomers, e.g., styrene, can also be used. The amount of haloalkyl styrene in the mixture can vary in the same proportions as previously described for halo styrenes.

When $n$ in the above generic formula is 2 or 3, the haloalkyl pendant group can be prepared by converting a bromo- or iodostyrene moiety of the polymer to its lithiated derivative and reacting the latter with ethylene or trimethylene oxide to form hydroxyethyl or hydroxypropyl groups on the aromatic ring. The hydroxyl group is converted to halo alkyl groups, by reaction with a halogen, e.g., $Br_2$ or $I_2$ in the presence of triphenylphosphite. The halo alkyl substituent on the aromatic ring is reacted with lithium dihydrocarbylphosphine.

Example IV

A cross-linked copolymer made by polymerizing a 2:1 molar ratio of styrene and p-bromostyrene with 2 mole percent divinylbenzene (based on total moles of monomer) at about 85° C., in an aqueous medium containing 0.19 weight percent methyl cellulose and 0.5 weight percent sodium dichromate in the presence of benzoyl peroxide catalyst was separated as small beads. The beads were washed with methanol, then with benzene and dried. 11.6 g. of these beads were swollen in 200 ml. dry benzene and converted to the lithiated derivative by reacting with a three-fold excess of butyllithium under nitrogen for three days. After removal of excess butyllithium by washing with benzene, the beads were treated with 1.7 g. (approximately one molar equivalent) of trimethyleneoxide in 10 ml. benzene at 0° C. The mixture was warmed to room temperature then refluxed four hours. The beads were treated with aqueous ammonium chloride, water, a mixture of THF and water, THF and finally with ether. The weight of the dried beads, 11.1 g., indicated a quantitative conversion of p-bromine atom to the 3-n-propanol derivative.

To 10 g. of this polymer (containing pendant (n-propan-3-ol)phenyl groups) swollen in benzene, were added 7.9 g. iodine and 10 g. of triphenylphosphite, and this mixture was refluxed approximately 16 hours. The beads were then washed with benzene and methanol. Upon drying 11.3 g. of copolymer containing pendant p-(3-iodo-n-propyl)phenyl groups was obtained. Elemental analysis indicated a nearly quantitative conversion.

In a flask were placed approximately 0.45 g. of a 50% lithium dispersion in hydrocarbon oil. The hydrocarbon oil was removed by twice washing with hexane under nitrogen. Then 20 ml. THF was added to the lithium. From a dropping funnel 1.11 g. of chlorodicyclohexylphosphine in 20 ml. of THF was added to the flask. The suspension was refluxed two days. The supernatant fluid was then transferred under anhydrous and oxygen-free conditions to a suspension of 2.0 g. of the polymer containing pendant p-(3-ido-n-propyl) phenyl groups preswollen in THF. After stirring 16 hours at room temperature followed by one hour at reflux temperature, the beads were washed and dried. The elemental analysis gave 4.29% phosphorous and 3.45% iodine which indicated about 85% of the 3-iodo-n-propyl groups were converted to the dicyclohexyl-3-n-propylphosphine groups. This polymer, when suspended in methylacrylate, resulted in the dimerization of methyl acrylate to dimethyl 2-methyleneglutarate.

Example V

A cross-linked copolymer made by polymerizing a 3:1 molar ratio of styrene and p-bromostyrene with 1.5 weight percent of divinylbenzene at about 70° C., in an aqueous medium containing 0.40 weight percent Elvanol® 50-42 (Du Pont) and 0.8 weight percent sodium dichromate in the presence of azobisisobutyronitrile catalyst, was separated as small beads. The beads were washed with water, methanol and finally with benzene. Approximately 15 g. of beads, swollen in benzene, were treated with an approximately three-fold excess of butyllithium (36 ml. of 2.94 molar solution) in benzene and stirred at room temperature for three days. The supernatant liquid was removed and the beads were thoroughly washed with several portions of dry benzene. The cross-linked polymeric lithiated derivative was reacted with 6.5 g. chlorodiethylphosphine (0.052 mole) by stirring several hours at room temperature. Excess chlorodiethylphosphine was removed by several washings with benzene, followed by tetrahydrofuran, in the absence of air. The polymeric beads containing pendant diethylphenylphosphine groups were dried of solvent and weighed 15 g.

These polymeric beads, when suspended in methyl acrylate, resulted in the dimerization of methyl acrylate to dimethyl 2-methyleneglutarate. The presence of the latter substance was confirmed by gas-liquid chromatography by comparison with authentic material.

The remaining cross-linked styrylphosphines disclosed herein also act as dimerization, oligomerization or polymerization catalysts for monoolefinic homopolymerizable monomers.

We claim:

1. Aromatic addition polymers having carbon-to-carbon chains, cross-linked through carbon-to-carbon bonds derived from polyvinyl aromatic hydrocarbons in a range of from about 0.1 to about 25 weight percent of total monomers in the polymerization, said polymers being insoluble in known organic solvents and having a plurality of pendent groups derived from about 10 to about 99 percent of the polymerizable mixture wherein $n$ is an integer from 0 to 3, R and $R_1$ each independently represents an alkyl group of from 1 to about 10 C atoms, a cycloalkyl group of from 3 to 10 C atoms, an aromatic hydrocarbon group of from 6 to 14 C atoms and alkylated derivatives of said cycloalkyl and said aromatic groups having from 1 to 4 substituents, said alkyl substituent having from 1 to 4 atoms and in which R and $R_1$ can be the same or different, and $R_2$ represents H and up to 4 alkyl substituents of 1 to 4 C atoms each.

2. A polymer of a structure of claim 1 in which R and $R_1$ are the same.

3. A polymer of claim 1 in which R and $R_1$ are different.

4. A polymer of claim 1 in which $R_2$ is H.

5. A polymer of claim 2 in which R and $R_1$ each is a phenyl group.

6. A polymer of claim 5 in which $R_2$ is H.

7. A polymer of claim 3 in which each of R and $R_1$ is a six-membered hydrocarbon group.
8. A polymer of claim 2 in which each of R and $R_1$ is a six-membered hydrocarbon group.
9. A polymer of claim 2 in which each of R and $R_1$ is a cyclohexyl group.
10. A polymer of claim 9 in which $R_2$ is H.
11. A polymer of claim 1 in which $n$ is 1.
12. A polymer of claim 1 in which $n$ is 2.
13. A polymer of claim 1 in which $n$ is 3 and R and $R_1$ each is a cyclohexyl group.
14. A polymer of claim 1 in which $R_1$ and $R_2$ each is an ethyl group.

References Cited

UNITED STATES PATENTS

| | | | |
|---|---|---|---|
| 2,398,736 | 4/1946 | Dreisbach | 260—87.5 R |
| 3,294,764 | 12/1966 | Pellon | 260—80 |
| 3,300,461 | 1/1967 | Olive | 260—89.5 |
| 3,444,208 | 5/1969 | McClure | 260—590 |

JAMES A. SEIDLECK, Primary Examiner

R. S. BENJAMIN, Assistant Examiner

U.S. Cl. X.R.

252—426, 437; 260—87.5 R, 88.2 C, 80.78